United States Patent Office 3,554,912
Patented Jan. 12, 1971

3,554,912
BASIC ALUMINUM SALT FIRE EXTINGUISHING COMPOSITIONS
Earl P. Moore, Jr., Wilmington, Del., assignor to E. I. du Pont de Nemours and Company, Wilmington, Del., a corporation of Delaware
No Drawing. Continuation-in-part of abandoned application Ser. No. 692,682, Dec. 22, 1967, which is a continuation-in-part of abandoned application Ser. No. 486,562, Sept. 10, 1965. This application Feb. 4, 1969, Ser. No. 799,547
Int. Cl. A62c 1/12; A62b 1/00
U.S. Cl. 252—3                                      6 Claims

ABSTRACT OF THE DISCLOSURE

Aqueous foams comprising water, from 2 to 40 percent by weight of a water dispersible polymeric basic aluminum salt, such as basic aluminum chloride, and from 0.02 to 4 percent by weight of an anionic organic acid compound containing from 6 to 18 carbon atoms per acid group, such as sodium lauryl sulfate, are useful in extinguishing and preventing the spread of fires by blanketing the burning and combustible material with a cover of foam.

CROSS-REFERENCE TO RELATED APPLICATIONS

This application is a continuation-in-part of my copending application Ser. No. 692,682, filed Dec. 22, 1967, now abandoned, which is in turn a continuation-in-part of my then copending application Ser. No. 486,562, filed Sept. 10, 1965, now abandoned.

BACKGROUND OF THE INVENTION

This invention relates to fire fighting compositions and more particularly is directed to methods of extinguishing fires and preventing the spread of fires comprising applying to burning and combustible materials a blanket of aqueous foam containing as essential ingredients water, from 2 to 40 weight percent of a water dispersible basic aluminum salt, and from 0.02 to 4 weight percent of an anionic organic acid compound containing from 6 to 18 carbon atoms per acid group.

Use of foams for extinguishing fires has developed rapidly in the past twenty years. However, it has been extremely difficult to find foamable compositions which would develop all of the desirable foam characteristics for fighting fire. For example, such foams as that disclosed in U.S. Pat. No. 3,041,190 are not well suited for fighting fire as they are not designed to combine mobility with rapid drainage, and they require an expensive alumina starting material.

I have discovered foamable compositions capable of generating foams whose volumes are as great as 30 times that of the original compositions. More importantly, the composition of these foams can be tailored to produce a foam blanket which is of a desired thickness and mobility and which drains at a desired rate. The foams thus produced can be stable at room temperature and at temperatures up to 50° C. and higher.

The foams of this invention are capable of carrying and holding in place large amounts of water and they can be dispensed from portable or large scale equipment involving only a single container. These foams can be propelled by a variety of gases or by water and can be stored for use either as a wet or dry composition.

SUMMARY

In summary this invention is directed to methods of controlling fires comprising blanketing burning and combustible materials with a coating of aqueous foam comprising water, from 2 to 40 percent by weight of a water dispersible polymeric basic aluminum salt and from 0.02 to 4 percent by weight of an anionic organic acid compound containing from 6 to 18 carbon atoms per acid group.

These foams provide an exceptionally effective and inexpensive method of controlling and extinguishing fires, acting as a water carrier to both smother and cool class A and C fires and as a vapor securing agent as well for class B fires.

DESCRIPTION OF THE INVENTION

The aqueous foamable compositions to be used in generating a foam blanket in accordance with this invention are prepared by merely mixing the polymeric basic aluminum salt with the organic acid compound in an aqueous medium. The order of admixture is not critical but it is often most convenient to prepare a sol of the basic aluminum salt and then disperse in it the organic acid compound.

The basic aluminum compounds suitable for use in the aqueous foamable compositions are called "polymeric" because in solution at pH's below 7 the aluminum salts polymerize into molecules approaching colloidal size. These basic aluminum compounds can be represented by the chemical formula $$Al_2(OH)_xZ_y$$

where $x$ and $y$ are positive integers, $x+y=6$ and Z is an acid anion such as chloride, nitrate, sulfate, phosphate, formate, acetate and the like.

Representative of suitable basic aluminum salts is basic aluminum chloride $$Al_2(OH)_5Cl$$

which polymerizes to form compounds such as $$Al_8(OH)_{20}Cl_4$$

Other suitable basic aluminum compounds are basic aluminum formate, basic aluminum acetate, basic aluminum hydroxyacetate, basic aluminum sulfamate, basic aluminum sulfate, basic aluminum nitrate, basic aluminum phosphate and basic aluminum carbonate. These compounds can be prepared by ion exchanging or electrolyzing the corresponding aluminum salt; by dissolving aluminum metal in the appropriate aluminum salt or acid solution; or by partially neutralizing the corresponding aluminum salt with a base.

A preferred basic aluminum is basic aluminum chloride also referred to as "Chlorohydrol"® and aluminum chlorohydroxide.

The foam coactants suitable for use in the compositions of this invention are organic acid compounds which contain 6 to 18 carbon atoms per acid group. When mixed in the above recited proportions with the water dispersible, basic aluminum salts and water these foam coactants permit the preparation of the foam blankets capable of controlling and extinguishing fires.

Representative of the organic acid compounds which are suitable for use as foam coactants in the compositions of this invention are compounds of the following formulae:

(1)                                                      $$R_2-\underset{R_3}{\overset{R_1}{\underset{|}{C}}}-Q$$

wherein $R_1, R_2$ and $R_3$ are the same or different and are (a) hydrogen,
(b) straight chain aliphatic, branched aliphatic or alicyclic, or
(c) any of (b) containing one unsaturation, provided that $R_1$ can be joined with $R_2$ or $R_3$ to form an alicyclic group which can also contain one unsaturation;

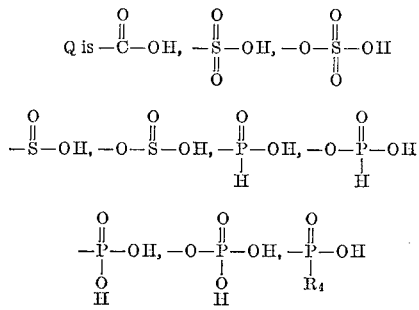

or

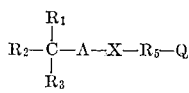

wherein $R_4$ is

with $R_1$, $R_2$ and $R_3$ the same as above, with the limitation that $R_4$ can contain between 1 and 10 carbon atoms; and the sulfate and phosphate esters of (a) esters of the above acids and polyfunctional alcohols or thioalcohols or (b) amides of the above acids and aminoalcohols; with the limitation that the compound must contain between 6 and 18 carbon atoms per acid group.

(2)   $R_2-\overset{R_1}{\underset{R_3}{C}}-A-X-R_5-Q$ wherein $R_1$, $R_2$ and $R_3$ are as in Formula 1, A is

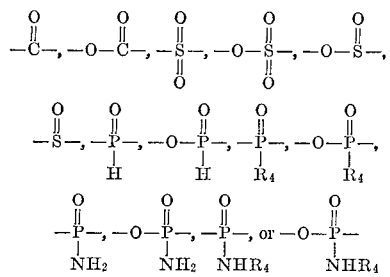

wherein $R_4$ is as in Formula 1; X is —NH—, —NR$_4$—, —O—, or —S—, wherein $R_4$ is as in Formula 1; $R_5$ is straight or branched aliphatic or alicyclic of 2 to 10 carbon atoms which can contain up to one hydroxyl, sulfate or phosphate radical per carbon atom; and Q is as in Formula 1; with the limitation that the compound must contain between 6 and 18 carbon atoms per acid group.

The salts and mixtures of the compounds of Formulas 1 and 2 are also effective as foam coactants. Typical salts are the sodium, ammonium, potassium, lithium and organic amine salts.

Where the organic acid is polyfunctional it can contain multiples of the number of carbon atoms as is represented by the compounds of the following formula:

(3)   $Q-R_6-Q_1$ wherein Q and $Q_1$ can be the same or different and can be any of the acid groups of Q in Formula 1; and $R_6$ is straight or branched aliphatic or alicyclic which can contain one unsaturation; with the limitation that $R_6$ must contain from 10 to 36 carbon atoms; amides of the above compounds; sulfate and phosphate acid esters of (a) esters of the above acids and polyfunctional alcohols or thioalcohols; or (b) amides of the above acids and aminoalcohols.

As with the compounds of Formulae 1 and 2, the salts and mixtures of the above compounds are suitable for use as foam coactants.

In some compounds the actual number of carbon atoms will exceed 18 per acid group. This is so because the coactant effect is apparent in compounds of Formula 4 below. It appears in such structures that the aromatic ring sructure behaves not as six carbons but more as two carbons in the ratio of total carbons to acid group.

(4)   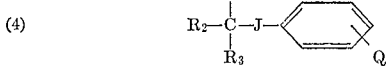

wherein $R_1$, $R_2$ and $R_3$ are as in Formula 1; J is —CH$_2$—, —O—, —S—, —NH—,

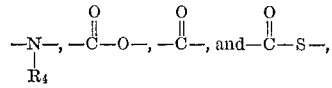

wherein $R_4$ is as in Formula 1; and Q is as in Formula 1.

As with the compounds of Formulae 1, 2 and 3, the salts and mixtures of the above compounds are also effective foam coactants.

Particular acid compounds which have been found to form suitable foams in accordance with this invention include salts of amides of 6 to 18 carbon fatty acids and hydrolyzed protein acids such as "Maypon UD" sodium undecylenyl polypeptidate, and "Maypon 4C" potassium cocoyl polypeptidate; straight chain saturated and unsaturated carboxylic acids such as hexanoic, heptanoic, octanoic, nonanoic, decanoic, undecanoic, dodecanoic, tridecanoic, tetradecanoic, pentadecanoic, hexadecanoic, heptadecanoic, octadecanoic, their mixtures, their unsaturated counterparts, as well as other unsaturated acids such as oleic and 10 undecylenic; mixed branched chain 6 to 18 carbon carboxylic acids such as neo-pentanoic, neo-heptanoic, neo-decanoic, and neo-tridecanoic; substituted acids such as perfluorooctanoic and omega-H-perfluorooctanoic acid; salts of the above acids such as the ammonium sodium, potassium, lithium and organic amine salts; aromatic compounds such as longchain alkyl benzene sulfonic acids including octyl benzene sulfonic acid, dodecyl benzene sulfonic acid, hexadecyl benzene sulfonic acid, and their ammonium, sodium, potassium, lithium and organic amine salts; other carboxylic acids such as p-octyl benzoic acid, and their ammonium, sodium, potassium, lithium and organic amine salts; and other compounds including ammonium, sodium, potassium, lithium and organic amine salts of esters of long chain 6 to 18 carbon monohydric alcohols such as hexanol, octanol, decanol, tetradecanol, hexadecanol, or octadecanol, and phosphoric or sulfuric acid, i.e., "Duponol" C, sodium lauryl sulfate, "Duponol" AM ammonium lauryl sulfate, and "Duponol" EL triethanol amine lauryl sulfate; and such compounds as cyclohexyl butyric acid; 10-hydroxydecanoic acid; "Maprosyl" 30 sodium lauroyl sarcosinate; 9-ethyl-eicosan - 1,20 - dioic acid; sodium pentachlorophenate; "Zonyl" S–13 mixed fluoroalkyl phosphates, dioctyl sodium sulfosuccinate; chlorendic acid; and "Zelec" UN fatty alcohol phosphate.

The organic amines referred to above as forming suitable salts with various acids are the amines of the formula

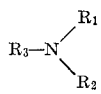

wherein $R_1$, $R_2$, and $R_3$ are the same or different and are hydrogen, methyl, ethyl, or 2-ethanol.

Representative of suitable organic amine salts are methylammonium dodecylbenzene sulfonate, diethylammonium decanoate, 2 - ethanolammonium tetradecanoate, tris(2-ethanol)ammonium p-octylbenzoate, 2-ethanolammonium dodecyl sulfate, triethylammonium tetradecyl sulfate, methylethylammonium decyl sulfate, bis(2-ethanol)ammonium dioctyl phosphate, and bis(trimethylammonium)hexadecyl phosphate.

Preferred foam coactants for reasons of most desirable foam properties are those containing 8 to 16 carbon atoms per acid group such as octanoic, decanoic, nonanoic, undecanoic, dodecanoic, tridecanoic, tetradecanoic, pentadecanoic, 10-undecylenic, neodecanoic, neotridecanoic, heptadecafluorooctanic, omega-H-heptadecafluorooctanoic, dodecyl benzene sulfonic, p-octylbenzoic and cyclohexyl butyric acids and their ammonium, sodium, potassium, lithium and organic amine salts, sodium lauroyl sarcosinate, dioctyl sodium sulfosuccinate, "Maypon UD" sodium undecylenyl polypeptidate, "Maypon 4C" potassium cocoyl polypeptidate, and esters of long-chain monohydric alcohols and sulfuric or phosphoric acids and their salts. The term "long-chain" as used above is intended to include alkyl of 6 or more carbon atoms, and where substituted compounds are mentioned the substituents are not limiting nor critical either as to kind or number.

The coaction between the above acid compounds and the water dispersible basic aluminum salt in an aqueous composition is not fully understood, however, some interaction between the components permits for generation of foams which have exceptional mobility, stability and draining properties.

The amount of basic aluminum salt used in the compositions of this invention will range generally from about 2 to about 40 weight percent of the total composition. Amounts of basic aluminum salts of less than 2% can be used to produce a foam but the consistency is such that it is generally less suitable for use as a fire extinguisher foam, unless stiffeners such as methyl cellulose or hydroxyethyl cellulose are added. Amounts of basic aluminum salt is excess of 40% can also be used to prepare a foam and amounts of from 40 to 50% are only a little less suitable than amounts below 40%. Amounts of basic aluminum salt in excess of 50% tend to make the composition too thick for preparation of a suitable foam.

As previously stated, the organic acid compound will be used in amounts ranging from 0.02 to 4 weight percent. The amount used is determined by the amount of basic aluminum salt that is used. The acid compound will be used in amounts ranging from about 1 to about 10 weight percent based on the weight of basic aluminum salt. While amounts of less than 1 percent can be used the quality of the foams tends to decrease with lower amounts of foam coactant. Amounts in excess of 10 percent can be used without any marked decrease in foaming effectiveness; however, since there is little apparent benefit derived from the use of larger amounts of organic acid compound, amounts in excess of 10 percent are considered superfluous.

Prior to foaming, the pH of the foamable composition can be adjusted for the purpose of altering the characteristics of the foamed composition. Ordinarily the compositions after interdispersion have a pH of about 4.0 to 6.5. However, if a foamed composition is desired which has greater stability and a lower rate of drainage, the pH of the foamable composition can be adjusted upwards prior to foaming. Adjustments can be made up to a pH of about 8.0 or 8.5 in accordance with the desired properties of the resultant foam. Generally speaking, the higher the pH of the foamable composition the greater the stiffness and nondraining properties of the foamed composition.

For pH adjustment dilute alkalis such as ammonium hydroxide, sodium hydroxide, potassium hydroxide, or lithium hydroxide can be used satisfactorily as required, as can organic water soluble bases such as triethanolamine. An alternative means of adjusting the pH is to ion exchange the sol of basic aluminum salt to partially deionize the salt.

The foamable compositions can be converted into foams by any of the many suitable means well known to the art. For example, the compositions can be foamed mechanically with vigorous agitation which can be obtained from traditional beater-type mixers, blender-type mixers or commercial foam producers. Alternatively the foam can be produced in pumping equipment designed to combine the foamable mixture and air under pressure. Still another method of producing the foamed compositions is by pressure release of the foamable compositions from containers such as aerosols.

Additives which can be used to enhance the compositions of this invention are those which will enhance the fire-fighting characteristics of the foamed compositions such as by giving foams more body or by improving their stability in the presence of fire. Representative of suitable additives are surfactants and such stiffeners as methyl cellulose, hydroxyethyl cellulose, and some starches.

The various additives can be admixed with the foamable compositions and foamed with them or they can be interdispersed with the foamed compositions after foaming. Generally speaking, it is preferred to mix the additives with the foamable compositions.

The foamable compositions of this invention can be converted to foams possessing almost any desired consistency by a variety of techniques. For example, by starting with a foamable composition which has the proper basic aluminum salt and organic acid compound concentration and fully developing the foam such as by mechanical means or from an aerosol disperser, one can achieve the predetermined characteristics. Alternatively, when mechanical foaming means are used, with any given concentration of basic aluminum salt and organic acid compound, foam development can be halted short of full development when desired characteristics are apparent. Still another manner of achieving the desired foam characteristics is to limit foam development by regulating the means of foam production such as gas quantity, gas pressure, rate of agitation, etc.

The foams are actually applied to burning or combustible material in the manner in which fire fighting foams are traditionally applied for this purpose. Such application ordinarily is made under pressure sufficient to leave the applicator out of danger from the fire. These methods of application are well known to those skilled in the art.

While the compositions of this invention have been described in terms of basic aluminum salts it should be understood that other aluminum compounds can be used in the compositions of this invention without departing from the concept of this invention.

For example, such aluminas as "Catapol" alumina, Alon C-49, Hydral 705, and Lepandin No. 20, can all be used in the compositions of this invention.

Similarly, fibrous alumina monohydrate can be used to generate similar foams through a narrower composition range.

In order that the invention can be better understood the following illustrative examples are given wherein parts and percentages are by weight unless otherwise noted.

EXAMPLE 1

Forty parts of a 50% solution of "Chlorhydrol" a basic aluminum chloride is diluted with 150 parts water and the pH is adjusted to 5.00 with dilute ammonium hydroxide in an Osterizer blender. To this solution is added 0.5 part of "Duponol" C, sodium lauryl sulfate, as a 10% aqueous solution and agitation is continued until a creamy, fluid foam is produced. The foam is poured onto the surface of burning gasoline in a small test area where it rapidly spreads to blanket the fire and extinguish it.

EXAMPLE 2

Eighty parts of a 50% solution of basic aluminum chloride is diluted with 120 parts water to give a 20% solution of pH 4.15. The solution is stirred in an Osterizer blender as 1.6 parts of ammonium octanoate is added and the partially developed foam is transferred to a "Hobart" mixer kettle where it is stirred at moderate speed to develop a smooth foam of the consistency of shave cream. This foam is used to blanket a pile of burning magnesium metal chips and extinguish the fire.

EXAMPLE 3

Ten parts of fibrous alumina monohydrate is dispersed in 199 parts water in an Osterizer blender to give a 5% sol and the pH is adjusted to 7.0 with dilute ammonium hydroxide. To this sol is added 0.1 part of "Duponol"® C as a 10% aqueous solution and stirring is continued until a maximum volume of creamy, fluid foam is produced. The foam is poured onto the surface of burning gasoline in a small test area where it rapidly spreads to blanket the fire and extinguish it.

I claim:

1. A method of extinguishing fires comprising blanketing the burning material with a stable, aqueous foam consisting essentially of water, from 2 to 40 percent by weight of a polymeric basic aluminum salt containing recurring groups of the formula

wherein $x$ and $y$ are positive integers;
$x+y=6$; and
Z is an acid anion;
and from 1 to 10 percent by weight based on the weight of basic aluminum salt of an anionic organic acid compound selected from the group consisting of saturated and unsaturated, straight chain, 6 to 18 carbon carboxylic acids; mixed, branched chain, 6 to 18 carbon carboxylic acids; alkyl benzene sulfonic acids in which the alkyl groups contain 6 to 18 carbon atoms; heptadecafluorooctanoic acid; omega-H-heptadecafluorooctanoic acid; p-octylbenzoic acid; cyclohexylbutyric acid; chlorendic acid; 10-hydroxydecanoic acid; 9-ethyl-eicosan-1,20-dioic acid; mixtures of these acids; their ammonium, sodium, potassium, lithium and organic amine salts wherein the organic amine is of the formula

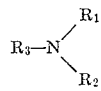

wherein $R_1$, $R_2$, and $R_3$ are the same or different and are hydrogen, methyl, ethyl, or 2-ethanol; the ammonium, sodium, potassium, lithium and organic amine salts of amides of 6 to 18 carbon fatty acids and hydrolyzed protein acids wherein the organic amines are as defined above; the ammonium, sodium, potassium, lithium and organic amine salts of esters of long-chain 6 to 18 carbon monohydric alcohols and sulfuric or phosphoric acid wherein the organic amines are as defined above; sodium lauroyl sarcosinate; dioctyl sodium sulfosuccinate; and sodium pentachloropenate.

2. A method of claim 1 wherein the basic aluminum salt is basic aluminum chloride.

3. A method of claim 1 wherein the organic acid compound is octanoic acid; nonanoic acid; decanoic acid; undecanoic acid; dodecanoic acid; tridecanoic acid; tetradecanoic acid; pentadecanoic acid; 10 undecylenic acid; heptadecafluorooctanoic acid; omega-H-heptadecafluorooctanoic acid; p-octylbenzoic acid; dodecylbenzene sulfonic acid; cyclohexylbutyric acid; their mixtures; or their ammonium, sodium, potassium, lithium, or organic amine salts wherein the organic amine is of the formula

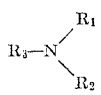

wherein $R_1$, $R_2$, and $R_3$ are the same or different and are hydrogen, methyl, ethyl or 2-ethanol; the ammonium, sodium, potassium, lithium or organic amine salts of amides of 8 to 16 carbon fatty acids and hydrolyzed protein acids, wherein the organic amines are as defined above; the ammonium, sodium, potassium, lithium, or organic amine salts of esters of long-chain 8 to 16 carbon monohydric alcohols and sulfuric or phosphoric acid, wherein the organic amines are as defined above; sodium lauroyl sarcosinate; or dioctyl sodium sulfosuccinate.

4. A method of preventing the spread of fire comprising blanketing the burning and combustible material with a foam consisting essentially of water, from 2 to 40 percent by weight of a polymeric basic aluminum salt containing recurring groups of the formula

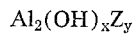

wherein $x$ and $y$ are positive integers;
$x+y=6$; and
Z is an acid anion;

and from 1 to 10 percent by weight based on the weight of basic aluminum salt of an anionic organic acid compound selected from the group consisting of saturated and unsaturated, straight chain, 6 to 18 carbon carboxylic acids; mixed, branched chain, 6 to 18 carbon carboxylic acids; alkyl benzene sulfonic acids in which the alkyl groups contain 6 to 18 carbon atoms; heptadecafluorooctanoic acid; omega-H-heptadecafluorooctanoic acid; p-octylbenzoic acid; cyclohexylbutyric acid; chlorendic acid; 10-hydroxydecanoic acid; 9-ethyl-eicosan-1,20-dioic acid; mixtures of these acids; their ammonium, sodium, potassium, lithium and organic amine salts wherein the organic amine is of the formula

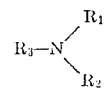

wherein $R_1$, $R_2$ and $R_3$ are the same or different and are hydrogen, methyl, ethyl, or 2-ethanol; the ammonium, sodium, potassium, lithium and organic amine salts of amides of 6 to 18 carbon fatty acids and hydrolyzed protein acids wherein the organic amines are as defined above; the ammonium, sodium, potassium, lithium and organic amine salts of esters of long-chain 6 to 18 carbon monohydric alcohols and sulfuric or phosphoric acid wherein the organic amines are as defined above; sodium lauroyl sarcosinate; dioctyl sodium sulfosuccinate; or sodium pentachlorophenate.

5. A method of claim 4 wherein the basic aluminum salt is basic aluminum chloride.

6. A method of claim 4 wherein the organic acid compound is octanoic acid; nonanoic acid; decanoic acid; undecanoic acid; dodecanoic acid; tridecanoic acid; tetradecanoic acid; pentadecanoic acid; 10 undecylenic acid; heptadecafluorooctanoic acid; omega-H-heptadecafluorooctanoic acid; p-octylbenzoic acid; dodecylbenzene sulfonic acid; cyclohexylbutyric acid; their mixtures; or their ammonium, sodium, potassium, lithium, or organic amine salts wherein the organic amine is of the formula

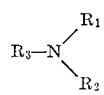

wherein $R_1$, $R_2$, and $R_3$ are the same or different and are hydrogen, methyl, ethyl or 2-ethanol; the ammonium, sodium, potassium, lithium or organic amine salts of amides of 8 to 16 carbon fatty acids and hydrolyzed protein acids, wherein the organic amines are as defined above; the ammonium, sodium, potassium, lithium, or organic amine salts of esters of long-chain 8 to 16 carbon monohydric alcohols and sulfuric or phosphoric acid, wherein the organic amines are as defined above; sodium lauroyl sarcosinate; or dioctyl sodium sulfosuccinate.

(References on following page)

References Cited

UNITED STATES PATENTS

| | | | |
|---|---|---|---|
| 2,114,042 | 4/1938 | Bertsch | 260—99.12 |
| 2,193,541 | 3/1940 | Timpson | 252—3 |
| 2,212,470 | 8/1940 | Friedrich | 252—3 |
| 2,382,732 | 8/1945 | Lowenstein | 252—307 |
| 2,915,475 | 12/1959 | Bugosh | 252—313 |
| 2,952,695 | 9/1960 | Stedehouder | 260—448X |
| 2,992,262 | 7/1961 | Sears et al. | 260—448 |
| 2,987,474 | 6/1961 | Wilson et al. | 252—8.6 |
| 3,031,418 | 4/1962 | Bugosh | 252—8.6X |
| 3,041,190 | 6/1962 | Griffith et al. | 106—40 |
| 3,207,578 | 9/1965 | Brown et al. | 252—313X |

JOHN T. GOOLKASIAN, Primary Examiner

D. J. FRITSCH, Assistant Examiner

U.S. Cl. X.R.

252—4, 8.05, 307